US009157639B2

United States Patent
Gallici et al.

(10) Patent No.: US 9,157,639 B2
(45) Date of Patent: Oct. 13, 2015

(54) COOKING OVEN COMPRISING EXHAUST GAS PURIFICATION ASSEMBLY

(75) Inventors: Irene Gallici, Precenicco (IT); Carlo Tomasselli, Farra di Soligo (IT); Thomas Fich Pedersen, Rothenburg (DE)

(73) Assignee: ELECTROLUX HOME PRODUCTS CORPORATION N.V., Zaventem (BE)

( * ) Notice: Subject to any disclaimer, the term of this patent is extended or adjusted under 35 U.S.C. 154(b) by 818 days.

(21) Appl. No.: 12/867,792

(22) PCT Filed: Feb. 4, 2009

(86) PCT No.: PCT/EP2009/000721
§ 371 (c)(1),
(2), (4) Date: Aug. 16, 2010

(87) PCT Pub. No.: WO2009/103415
PCT Pub. Date: Aug. 27, 2009

(65) Prior Publication Data
US 2010/0326290 A1    Dec. 30, 2010

(30) Foreign Application Priority Data

Feb. 21, 2008    (EP) .................................... 08003159

(51) Int. Cl.
*H05B 3/44*    (2006.01)
*H05B 3/50*    (2006.01)
(Continued)

(52) U.S. Cl.
CPC ............. *F24C 14/02* (2013.01); *F24C 15/2014* (2013.01); *A23L 3/005* (2013.01); *B01J 23/42* (2013.01); *B01J 37/0215* (2013.01); *F01N 3/2026* (2013.01); *H05B 3/48* (2013.01)

(58) Field of Classification Search
CPC ........... B01D 46/0019; B01D 46/0023; B01D 46/0039; B01D 46/0041; B01D 46/0006; B01D 46/10; B01D 46/12; B01D 2275/10; B01D 17/045; B01D 35/0276; B01D 23/28; B01D 36/003; B01D 29/01; B01D 39/1623; B01D 45/12; B01D 45/16; B01D 45/08; B01D 50/002; B01D 50/00; A23L 3/005; F24C 14/02; F24C 15/20; F01N 3/2026; F01N 3/0222; H01C 7/027; H05B 2203/02; H05B 3/48; H05B 3/16

USPC ............ 99/451; 219/412, 391, 552, 553, 505, 219/544, 546; 210/335–339; 55/523, 524, 55/DIG. 36, 315, 318, 320–323, 485–489

See application file for complete search history.

(56) References Cited

U.S. PATENT DOCUMENTS 4,413,301 A * 11/1983 Middleman et al. .......... 361/106
4,535,589 A * 8/1985 Yoshida et al. ................ 60/303

(Continued)

FOREIGN PATENT DOCUMENTS

EP    0747124    12/1996
EP    747124 A1 *   12/1996

(Continued)

OTHER PUBLICATIONS

International Search Report for PCT/EP2009/000721, dated Apr. 8, 2009, 3 pages.

(Continued)

*Primary Examiner* — Dana Ross
*Assistant Examiner* — Hemant Mathew
(74) *Attorney, Agent, or Firm* — Pearne & Gordon LLP (57) ABSTRACT

A cooking oven comprising a cooking cavity and an exhaust gas purification assembly comprising a self-heated filter element comprising a gas-permeable, electrically conductive silicon carbide material and a current supply structure operable for self-heating said filter element. Preferably, said purification assembly comprises a self-heated filter element comprised of a foamed silicon carbide structural element.

16 Claims, 3 Drawing Sheets

(51) Int. Cl.

| | |
|---|---|
| *A23C 3/07* | (2006.01) |
| *A23L 3/00* | (2006.01) |
| *F24C 14/02* | (2006.01) |
| *F24C 15/20* | (2006.01) |
| *H05B 3/48* | (2006.01) |
| *F01N 3/20* | (2006.01) |
| *A23L 3/005* | (2006.01) |
| *B01J 23/42* | (2006.01) |
| *B01J 37/02* | (2006.01) |

(56) References Cited

U.S. PATENT DOCUMENTS

| | | | | |
|---|---|---|---|---|
| 4,813,231 | A | * | 3/1989 | Bykowski ................. 60/274 |
| 5,764,850 | A | * | 6/1998 | Olstad et al. ............. 392/485 |
| 2001/0052515 | A1 | | 12/2001 | Allera et al. |
| 2005/0092181 | A1 | * | 5/2005 | Shih et al. ................. 95/283 |
| 2005/0173414 | A1 | * | 8/2005 | Ishii et al. ................ 219/549 |
| 2005/0191218 | A1 | * | 9/2005 | Alward et al. ............ 422/180 |

FOREIGN PATENT DOCUMENTS

| | | | |
|---|---|---|---|
| GB | 1316993 | * | 5/1973 |
| WO | 03004438 | | 1/2003 |

OTHER PUBLICATIONS

Slaven, et al. "Mechanical property evaluation at elevated temperatures of sintered beta silicon carbide". International Journal of High Technology Ceramics, Elsevier Applied Science Publishers, Barking, GB. vol. 2, No. 1, Jan. 1, 1986, pp. 47-63/.

* cited by examiner

COOKING OVEN COMPRISING EXHAUST GAS PURIFICATION ASSEMBLY

TECHNICAL FIELD OF THE INVENTION

The present invention relates to a cooking oven, such as a domestic or professional cooking or baking oven, a microwave oven or a grill oven, comprising a cooking cavity and an exhaust gas purification assembly to purify the gases released from the cooking cavity.

BACKGROUND OF THE INVENTION

Cooking, particularly frying and baking, releases air including fumes such as fat vapors, odor particles and/or hydrocarbons. Some fumes produced during cooking are desirable, since they are the source of appetizing aromas. However, other fumes are less desirable, particularly greasy vapors and smoke-like gaseous and particulate products, that accumulate on the inner surfaces of the oven, forming encrusted residues, and therefore require the oven to be frequently cleaned and maintained. If the fumes are simply vented outside the oven, as most known ovens suggest, the room rapidly becomes filled with fumes, which leave a film on the room's walls and ceiling and may also leave an odor that lasts for several days.

A known operation for cleaning ovens is treatment by pyrolysis that involves destroying the grease deposits or other residues that appear on the walls of an oven during cooking by a heat treatment. However, the burning of greases or stains again generates fumes, which may contain more or less harmful gases such as carbon monoxide.

It is thus desirable that harmful as well as unpleasant fumes be treated before they escape from the oven so that their presence does not jeopardize the atmosphere of the room.

Such fume and odor elimination in current cooking devices is typically handled by bleeding a small amount of the oven cavity air into a single pass, low temperature catalytic filter element, located between the cooking cavity and the appliance exhaust vent. In the catalytic filter element, airborne cooking fumes are oxidized into carbon dioxide and water, thereby preventing fumes and odors from escaping into the environment.

Such a catalyst filter element requires to be heated to a temperature of at least 180° C. before it can operate properly.

This is usually attempted by locating the catalyst filter assembly in the vent duct arrangement sufficiently close to the outlet from the oven that hot air from the oven heats the catalyst filter assembly.

Other technical solutions are known that provide a high temperature heating of the filter elements by individual heating means, and require the passage of electric current through heat-generating electrodes or heater coils for attaining a similar result.

One known design uses a catalyst supported on an electrically conductive wire, wherein the conductive wire is used as a resistive heater. But even when the wire is provided in a design comprising a plurality of wires arranged in a net like or screen like structure, a problem associated with this design is to keep the column of contaminated air in physical contact with the catalyst wire net for a period long enough for it to do its work as this design provides a low specific surface area.

Accordingly, catalyst coated wire screen design are generally inferior to a design that uses catalyst coated gas-permeable ceramics. Standard catalytic converters for self-cleaning ovens normally include a catalyst coated ceramic honeycomb-shaped disk. The honeycomb-shaped disk comprises a large number of cellular passages whose walls are coated with an appropriate catalytic agent for aiding in the combustion of the cooking vapors. For heating up to a selected temperature, the ceramic honeycomb disk is threaded with a high resistance electrical wire to provide an auxiliary heating means.

Also known from DE 4139 904 is an oven, provided with a concentric auxiliary heating element, which is surrounded by a catalytic converter assembly, wherein the catalyst is deposited as a coating on a foam ceramic of e.g. aluminum oxide or silicon carbide.

However, these designs, using a ceramic structure, always need an auxiliary electric heater, and thus the total electrical consumption of the oven is greater than for an oven with only a forced hot gas circulation heating system but without such catalytic filter elements. In addition, auxiliary heating up of the ceramic catalyst assembly can be insufficiently rapid, leading to release of undesirable smoke or fumes from the oven.

Moreover, the temperature distribution of a ceramic filter structure heated by an auxiliary heater may be non-uniform, resulting in narrowing of a region in which the burning of fumes occurs and thus difficulty in effective combustion of the cooking fumes. As a result, unburned residues may accumulate near an end surface of the filter element, flow paths openings on a filter inlet side may be clogged, resulting in a decrease in function.

SUMMARY OF THE INVENTION

Thus, there is a continuous need for a cooking appliance with an effective exhaust gas purification assembly, in which the combustible components in the cooking fumes are completely converted, so that no unpleasant or harmful gases are likely to be produced, even when the exhaust gases are to be discharged directly into the kitchen atmosphere.

According to the invention a cooking oven is provided comprising a cooking cavity and an exhaust gas purification assembly comprising a filter element comprising a gas permeable, electrically conductive silicon carbide material and a current supply structure operable for self-heating said filter element.

In the present exhaust gas purification assembly, the electrical properties of the silicon carbide material provide a novel approach used to burn off the collected fumes.

As the silicon carbide material used is electrically conductive, electrical contact can be made directly to its surface to provide resistive heating thereof. Rather than using a separate supplemental electric heating element to heat the filter element above combustion temperature, the current is passed directly through the silicon carbide material. The silicon-carbide material, as current flows through it, will become hot enough to effect oxidization of collected particulate.

Silicon carbide has turned out to be an especially suitable filter material, since it is chemically stable, has a great heat conducting capacity, and is resistant to temperature and thermal stress.

As the material does transfer the heat effectively, odorous fumes can be quickly heated up to a combustion activation temperature to enable effective combustion of deleterious vapors in the oven exhaust stream. There is likewise little danger of inoperative dead zones occurring in the filter material.

Thus, use of the self-heating assembly according to the invention eliminates the need of a pre-heating step before catalyst or non-catalyst combustion, so that the combustion passage time can be shortened. As a result, the size of the assembly can be decreased, and the range of applications can be broadened.

According to a particularly preferred embodiment of the invention, the silicon carbide material is provided as an open-cell silicon carbide foam.

These foams are compact, provide excellent heat and mass transfer, and generate little pressure drop on the flowing gas stream, all of which are distinct advantages over conventional honeycomb structures.

Particularly, if the cellular passage structure of a foamed silicon carbide material is covered with a precious metal catalyst, the unique-structure of the open-cell silicon carbide foam allows the fumes excellent access to an extremely large catalytic surface.

Because of the low thermal capacity of the ceramic foam and because the combustion process is distributed evenly throughout the entirety of the ceramic foam, the ceramic foam heats up very quickly. That means that only after a short period of operation the filter unit operates efficiently.

Silicon carbide, in addition, provides an open-cell foam with good mechanical rigidity at relatively low density. As the foam material is a self-supporting nature, it eliminates a pressure drop, which would otherwise be caused by holding or mounting means.

Advantageously the open-cell foamed silicon carbide material has an open-cell porosity of 30 to 90%. A foam structure with high open-cell porosity is preferred as it causes a low-pressure drop across the filter element.

A further increase in the surface of the filter body may be obtained by providing a filter element having a relatively larger mean pore size, such as 0.05 to 5 mm. That allows the fumes to penetrate deeper into the filter structure for improved heat transfer or for interaction with an active catalyst coating on a larger surface area.

According to one embodiment of the invention, the filter element is composed of zones of different porosity to redistribute the flow of volatiles to attain a substantially complete combustion effect.

According to a preferred embodiment, the filter element is provided with a catalyst coating to enhance flameless oxidation reaction at lower temperature. A silicon carbide substrate in general minimizes thermal expansion mismatch between support and catalyst coating and would be preferred, as it can withstand high temperatures without substantial scaling of the surface thereof.

Because the catalyst coating is provided directly on the surface of the self-heating filter element, it heats up rapidly when the filter element is energized. It is almost immediately effective to deal with the fumes generated during a cooking operation or a high temperature self-cleaning cycle effected in the oven cavity.

The catalyst coating suitably comprises platinum, palladium, rhodium, vanadium, titanium, zirconium, copper, nickel or in any combination or alloy thereof.

The current supply structure of the exhaust gas purification assembly may be in the extremely simple and compact form of a single pair of electrodes. Otherwise, the current supply structure may comprise a plurality of electrode pairs for a uniform current and temperature distribution or to provide different wattage to the filter element.

Preferably, the filter element comprises at least one contact zone, which may consist of an infiltrated or plated metal area.

Suitable electrode designs may include a pair of electrodes consisting of a central electrode and a peripheral electrode. Suitable electrode designs also include two-dimensional electrode designs, such as mesh and comb electrodes, to improve current distribution in the structural filter element.

DESCRIPTION OF SPECIFIC EMBODIMENTS

Figure 1:
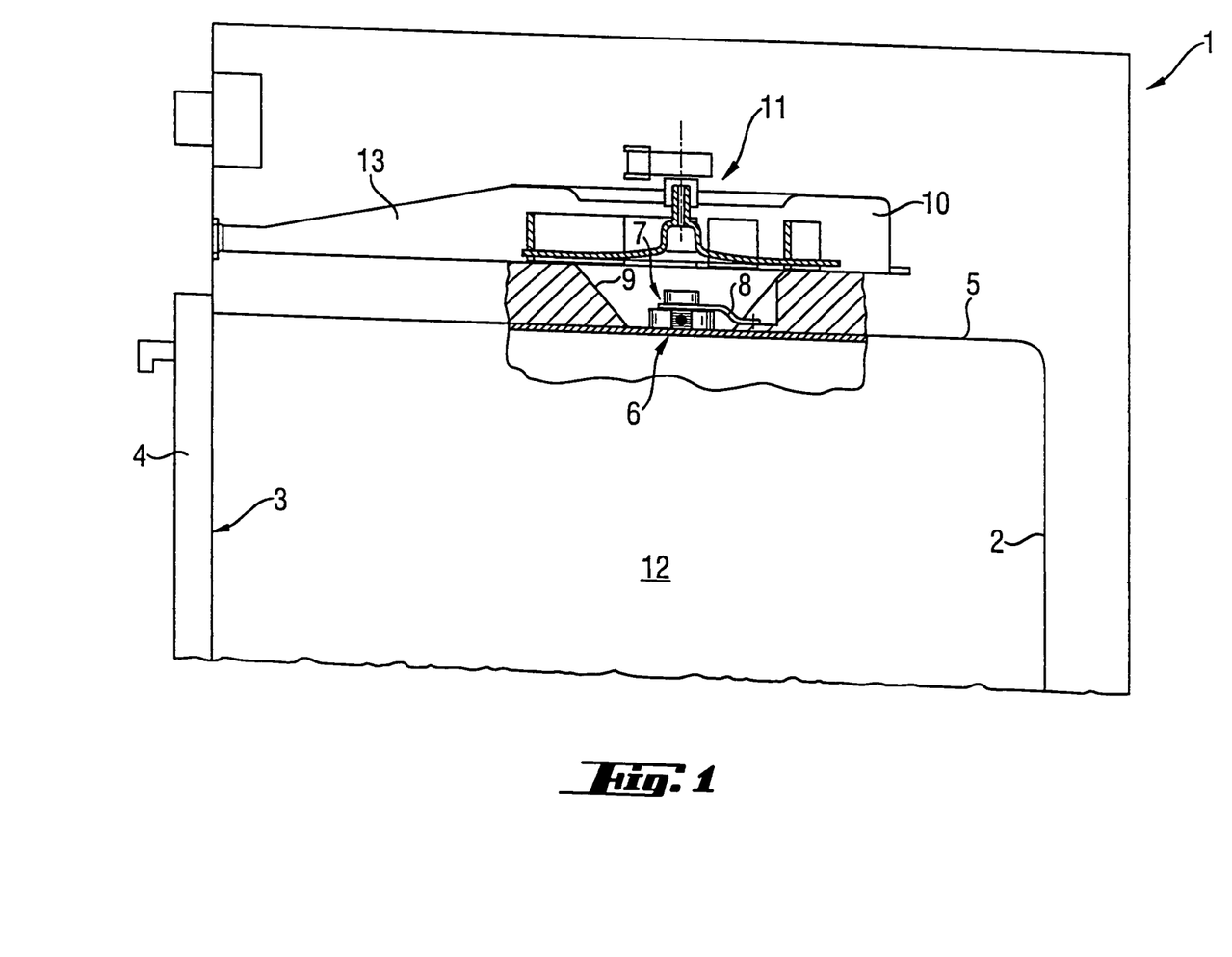
FIG. 1 is a partly schematic view of a side vertical section of a cooking oven according to the invention.

Referring first to FIG. 1, there is schematically illustrated a conventional cooking oven 1, which has an oven cavity 12, formed by oven liner 2. Beneath a top wall are side, rear and bottom walls defining an insulated oven cavity having its open front 3 closed by a door 4. The door may be pivotally mounted by any suitable hinge means. The oven as shown is provided with upper and lower heating units.

A cooking oven according to the invention may be of the so-called self-cleaning or pyrolytic type that is capable of being heated above a maximum food cooking temperature up to a temperature of about 400° C. At this temperature, any food residues which may have been deposited and remain as a crust on an inner surface of the oven liner during previous cooking operations, become pyrolytically decomposed and gasified.

The invention may also advantageously be used in a cooking oven with a forced air convection system for circulating a convection airflow in an oven interior, in order to perform a cooking operation. An additional benefit of the convection airflow is that the oven walls are kept hot, reducing the tendency for residues to build up.

The oven illustrated in FIG. 1 comprises an exhaust duct 10 above the top wall of the oven cavity. An exhaust passage 13 communicates to an outlet from the cooking cavity in the shape of a conical opening plenum 9 extending in the width direction of the oven cavity. The duct accommodates the exhaust gas purification unit 7 and serves for the controlled discharge of the hot fumes from the inside of the oven cavity to the environment.

In the illustrated embodiment, the vent duct is provided at the upper part of the cooking cavity, but in some oven designs it may be arranged behind the rear wall of the oven cavity to reduce heat loss, caused by high temperature gas moving to the upper part of the cavity and from exhaust to the outside of the cooking oven.

To bring the fumes in the oven cavity into contact with the exhaust gas purification unit there is provided a motor driven fan 11 in the portion of the duct immediately above the exhaust plenum. The fan impeller is driven at a rate sufficient to produce a negative pressure within the cooker cavity as compared to the pressure of the ambient, so that a pressure gradient is formed from the ambient through the cooking cavity and through the exhaust gas purification assembly 7, so that all cooking vapors are drawn there through. The purged gas is then forced out to the ambient.

The vent duct may additionally be provided with a thermostat immediately above the fan, useful to cut off the current through the filter element in the event that the temperature becomes undesirably high, as it may happen, since the catalytic reaction of cooking fumes is exothermic, once the reaction is initiated and is self-sustaining, if sufficient combustible gases are present.

The exhaust gas purification assembly comprises at least one first filter element 72 composed of a gas-permeable, electrically conductive silicon carbide material and eventually an active catalyst phase, surrounded by a solid casing 71 made of a material impermeable to gases and resisting to the working temperature of the device. This casing is equipped with at least two openings. The bottom wall of the casing has an inlet open adapted to be connected to the vent opening in the oven liner, another opening serves for the outlet of exhaust gases.

Figure 2:
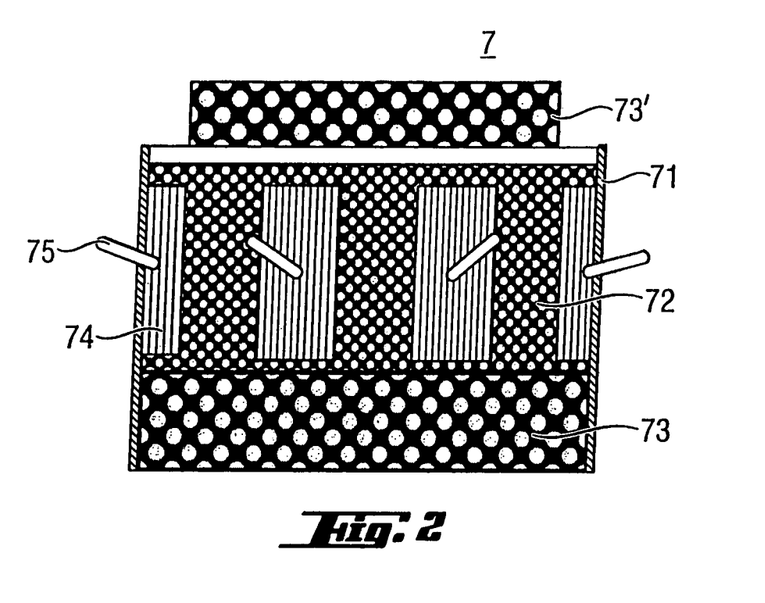
FIG. 2 is an enlarged cross sectional view of an embodiment of the exhaust air purification assembly according to the invention.

A particular form of the assembly that has been found favorable is illustrated in the view of FIGS. 1 and 2.

The units as shown are circular in cross section. That is, the filter elements are circular-cylindrical in shape. But, of course, the shape of filter element need not be a circular cylinder, and can be a rectangular solid, a hexagonal or oval cylinder, or indeed any other shape, which may be dictated by the space requirements of the vent plenum in which it is to be mounted.

In addition, the geometry can be modified to a conical shape or include conical shape impressions to provide for a chimney effect in the filter element.

The dimensions of diameter and length of the assembly is selected to ensure an as large as possible catalytic surface area consistent with an arrangement of the assembly in an exhaust passages—to enhance contact and to extend the contact time.

Thus the assembly may be made small in diameter compared to length, and also irregular or awry in shape, in order to produce a turbulent flow of air that will tend to impinge against the passage surface once or more as it passes there through, so that substantially all of the fumes and greases of the cooking air are subjected to catalytic oxidation. As a foamed silicon carbide material is self-sustaining and easily machinable, it provides no restrictions to any design of the filter element.

Optionally, a sealing ring is provided around circumference of the filter element, forming a seal between the interior wall surfaces of the casing 71 and the outer circumferential surface of the filter element 72, to reduce gas bypass.

As the self-heated filter element should be mounted insulated and grounded, a base layer of insulation material, such as microporous insulation material, may be arranged as a dish-like support 6.

The filter element may be arranged in singularity or in plurality in the exhaust plenum of the vent duct.

In one modification, the filter element may include a first and a second filter in spaced insulated relation and provided with a separate set of electrodes so that the filter elements may be used separately or in parallel. According to one embodiment of the invention, two filter elements of different wattage are combined in the exhaust gas purification assembly. One element alone is used for baking when less catalytic oxidation is required and when it is desired to keep the heat emitted at a minimum to prevent overshooting the desired baking temperature. Both elements may be used for broiling since the amount a smoke and fumes generated is greater during broiling and overshooting of the selected temperature is less objectionable than during baking.

The modification shown in FIG. 2 includes three filters elements 72, 73, 73', installed in series to the flow of exhaust gases. A first filter element is used to redistribute a gas stream; only the second filter element bears a catalytic coating to reduce cost of precious metals. A third element of reduced transverse cross section assists in creating a chimney effect.

The exhaust gas purification assembly as shown is retained in position by a fastening means 8, comprising a spring member of generally U-shaped configuration, which is mounted to the top of the oven liner. This arrangement allows the simple removal of the device. Other fastening means may include clamps, clips, brackets or the like, as known in the prior art.

According to the invention, the filter element comprises an electrically conductive silicon carbide material, permeable to any gases, particularly to such gases as smoke or fumes generated in a cooking cavity.

According to one embodiment of the invention, the filter element comprises the silicon carbide material provided as a filter cartridge, containing a gas-permeable bed of packed grains as the filter medium. According to another embodiment, the filter element is composed of an open network of co-sintered silicon carbide grains. In a further embodiment, the filter element includes a catalyst coated honeycomb-shaped disk.

However, according to a preferred embodiment of the invention, the filter element comprises an open-cell silicon carbide foam structural member.

Silicon carbide foam is a lightweight material made of self-bonded silicon carbide and foamed into shapes, which is available commercially from a number of manufacturers.

Commercially available silicon carbide foam is fabricated, starting with polyurethane foam of desired pore size. The polyurethane foam is impregnated with resin, then pyrolized to form a reticulated vitreous carbon foam. The carbon foam is infiltrated with silicon carbide by a chemical vapor deposition process, wherein the silicon carbide is layered on the interior skeleton of reticulated vitreous carbon.

After the SiC layer is deposited, the carbon foam is removed pyrolytically to leave a monolithic SiC foam core.

Figure 4:
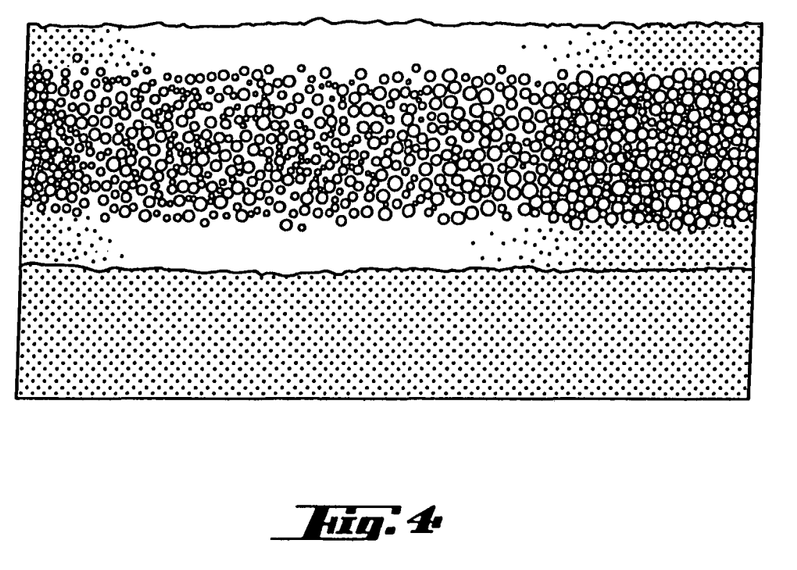
FIG. 4 is a cross sectional view of a silicon carbide foam comprising an infiltrated contact zone.

The product made by the foregoing process may then be machined into various physical forms. To provide a densified SiC surface for the application of an electric connection, a thin layer of SiC cement may be applied over the foam. This forms a laminated facesheet, as shown in FIG. 4, which can act as a substrate for a current supply structure according to the invention.

Figure 3:
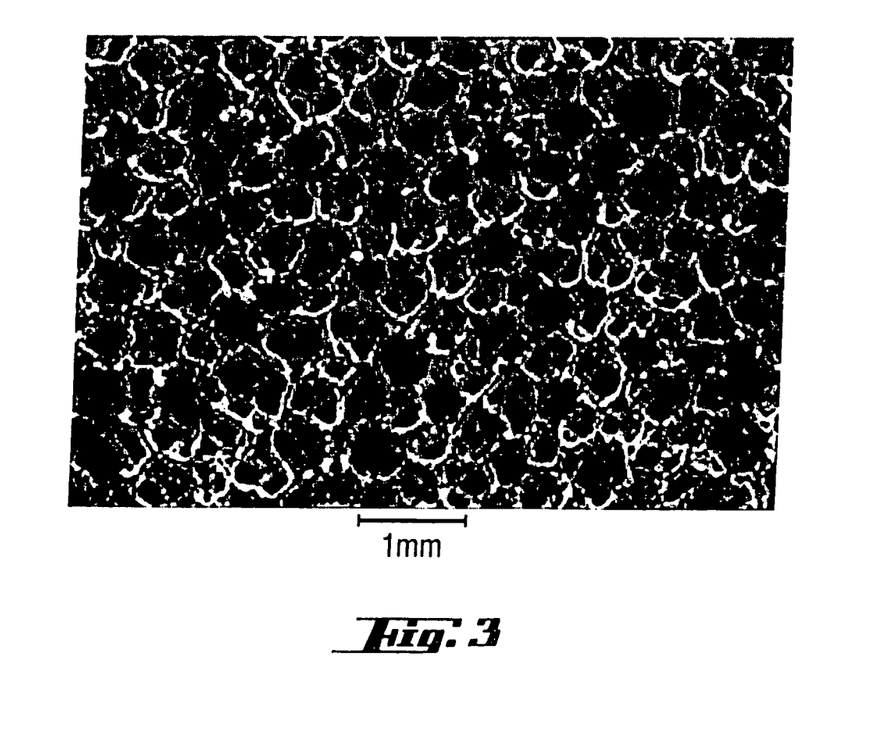
FIG. 3 is a SEM micrograph of an open-cell silicon carbide foam.

A silicon carbide foam, as used with this invention, is characterized by an open-cell structure, as shown in FIG. 3. The open-celled foam includes a matrix of thin porous walls, which define a plurality of cells, or passageways connected to one another extending longitudinally and mutually parallel there through between the inlet and outlet end faces of the structure.

Especially due to the high mechanical strength of a filter element consisting almost entirely of silicon carbide, extraordinary thin filtering walls may be obtained. Thus, the foam material may be very porous, typically from 30% to 90% porosity. This means that about 30 to 90% of the macroscopic volume of a SiC foam part is occupied by pores. Therefore, gas may flow through the material very easily. That will also help to provide an extended area and period of contact of the catalyst and the hot gases.

As the silicon carbide foam bodies may be manufactured with a well-defined, substantially uniform pore size, also the pore size may be chosen to enable the fumes to flow completely through the walls and to restrain most or all of the particulates from passing completely through the walls.

The mean pore size of the porous SiC filter segments will normally be selected in the range of 0.05 to 5 mm. With a pore size less than 0.05 mm the pressure loss in the resulting filter element would be excessive. In practice, it is preferred not to drop below 0.1 mm. With a pore size more than 5 mm the resulting filter medium does not have sufficient retention efficiency.

Advantageously, the filter medium may be composed of a cellular foam with zones of different porosity distribution, formed either by providing a sequence of foams with different pore sizes, or by a single part with a porosity gradient, or by a combination of the two. For each zone, the average porosity preferably is within the ranges mentioned above.

When foods are cooked at a high temperature, then the oil fumes and the oil drops are not always flowing at a constant rate, but sometimes the oil fumes come popping out through the surface of the food in small bursts. Accordingly, a part of the filter element may be designed to equalize the amount of the oil fumes, and also to play the role of a dispersant to make the contact of the oil fumes with the catalyzer as uniform as possible. In accordance with this embodiment of the present invention, the fumes may be preliminarily filtered through a relatively coarse foam filter element to evenly and quickly redistributed fumes across the entire cross-section of foam sample, followed by filtration through a relatively fine, filter element to provide an effective homogenization of a flowing gas stream.

According to one embodiment of the invention a suitable catalytic coating material covers the inner and/or outer surfaces of the silicon carbide material at least in part, so as to reduce the temperature at which an oxidation of fumes and odors occurs. The catalytically active material may, e.g., be selected from platinum, palladium, rhodium, vanadium, titanium, zirconium, copper, nickel or in any combination or alloy thereof, as well as, for each selected active elements or for some of them, in chemical combinations/compounds with oxygen, nitrogen, etc. By way of example, the catalyst known as "platinum black" is suitable for devices to be used with cooking appliances.

The catalytically active coating is suitably added to the filter body by introducing a slurry/solution that contains the catalyst material as ultra-fine powder and a carrier as water or an organic, a salt, acid or non-organic solution, in the filter body and subsequently removing the liquid carrier. However, also other known methods of application of catalytically active elements on the surfaces of the filter, may be used, such as PVD techniques, etc. The presence of at least one of these catalyst metals lowers the combustion temperature and enables continuous combustion at low temperature, thus preventing the accumulation of dirt in the device.

As the filter element is intended to be used as an electrically energizable afterburner, it is connected to a current supply structure, so that, if current is made to pass through portions of the filter element, the passage of such current causes the usual I2 R heating effect.

To that aim, electrodes 74, 75 are fixed in pairs to the silicon carbide foam volume such that electrical contact is made between the foam and each electrode.

In most embodiments of the purification assembly, the filter element will be supplied with a single electrode pair of an electrically conductive material substantially at each end of the filter element in axial or lateral direction.

Such electrodes should be made in such a shape and arrangement that they provide a flow of current through the foamed structural element having a current density as uniform as possible.

Various design patterns may be followed, for example, voltage may be applied between coaxial electrodes or two rod electrodes, spaced apart within the filter element.

Otherwise, a plurality of electrodes is radially spaced around the outer surface of the filter element, with six such electrodes being illustrated at FIG. 2. Thereby, it becomes also possible to arrange suitable electrical connections for different wattage, these connections being either serial, or parallel where applicable, or a combination thereof.

It is also desirable, that the electrode arrangement provides an enlarged contact zone, for example by a two-dimensional electrode design.

Example given, a first and a second conductive mesh screen may be applied to cover the side faces of the filter element in electrical contact with the foam material, so that electrical power can be applied between the two mesh units to provide an electrical current path through the entire electrically conductive carbide foam.

A comb-shaped electrode arrangement may be an alternative.

The connection of the electrodes to the foamed filter element must be able to withstand the extended thermal stress and corrosion by hot cooking fumes. Further, as little contact resistance as possible must be sought. Achieving a mechanically and electrically connection creates considerable difficulties because of the porous and rough surface of a foamed silicon carbide part.

According to one embodiment, the electric current may be supplied in a known manner through slip rings and slip contacts for easy replacement of the filter element.

Otherwise, the connection of the electrodes to the silicon carbide may also be performed by brazing or soldering, in ways known per se.

According to a further embodiment shown in FIG. 2, metallic conductors, such as small metal plates or plugs, are embedded in the foamed structural element. The metallic conductors 74 will conveniently have electrical lead wires 75 attached to them, thereby forming what is conventionally understood to be electrodes.

According to a further embodiment, a part of the surface of the foamed body is metallized with a suitable metal, such as silver, to form a contact zone for an electrode. The filter element is preferably metal sprayed with e.g. Al to enable electrical contact to the filter segment by soldering. It is possible to solder electrical connections directly on to flame sprayed areas of the filter element.

In a further embodiment of the present invention, a metal alloy or any other suitable material capable of conducting electricity is infiltrated on a face of the foamed body, to provide a structure in which a fully dense contact zone is integrally bonded to porous, open-cell silicon carbide foam.

Having an electrically conductive metal infiltrated into them may increase the electrical conductivity of the contact zones by a factor of 10 to 100. Further, a smooth surface results. Both favor the soldering on of leads by which then electrical current can be conducted through connecting zones and foam parts. But care should be taken that the conductive layers do not block the apertures of the cells within the filter that is the flow of the exhaust gases through the filter is not impeded.

The ends of the electrodes are brought out and connected in parallel relation to an insulating terminal block fastened to the oven liner for connection to a standard power line. The source of current may be a nominal 220 volt 60 Hz. power supply.

Although the self-heating filter element in the filter as hereinabove described are supplied with an electric current independently of the fan, it is alternately possible to construct the filter so that they may form a single unit, as far as the supply of an electric current is concerned.

In operation, the greasy vapor and particles released from the food is withdrawn from oven cavity by the fan 11. During this withdrawal, the vapor passes through the filter element 7, which retains the grease and any food particles released during the food preparation.

Current flow is caused to pass through the filter element and, due to the resistance of the foamed silicon carbide material, will cause the foam material to heat up.

As stated above, the current is designed to heat the filter element up to a temperature above a minimum temperature of 180° C., this being sufficient to start burning off of any greasy constituents of the exhaust gas. However, the temperature of the filter element should desirably be kept at 230° C.-400° C. If the temperature is lower than 180° C., the greasy fumes and the particles are not decomposed, but are collected as dew, thereby blocking the exhaust gas flow.

Although it may be desirable to have a temperature higher than 400° C. for the decomposition of the oil fumes, such an excessively high temperature is deleterious to the safety of the cooking oven and to the cooking effect. Therefore, the temperature should be lower than 400° C.

Since the filter element becomes hot quite rapidly, the fumes and particles in the exhaust gas are quickly oxidized under the influence of the catalyst on the walls of the filter element, so that only clean air is be discharged. The grease therefore does not come into contact with the fan 13 or with the electrical parts associated with it, so preventing any possible damage to these components, which could impair operation. At the same time, the use of the exhaust gas purification prevents greasy vapors and bad odors released during food preparation from dispersing freely into the environment.

Although the present invention has been has been described with reference to preferred embodiments thereof, it should be understood that the invention is not limited to the embodiments, but rather that various changes or modifications thereof are possible without departing from the spirit of the invention. Accordingly, the scope of the invention shall be determined only by the appended claims and their equivalents

LIST OF NUMERALS

1 Cooking oven
2 oven liner
3 front opening
4 oven door
5 top wall
6 assembly support
7 exhaust gas purification assembly
71 housing of assembly
72 first filter element
73, 73' second filter elements
74 contact zone
75 electrode
8 fastening means
9 exhaust plenum
10 duct vent
11 fan
12 oven cavity
13 exhaust passage

What is claimed is:

1. A cooking oven comprising a cooking cavity and an exhaust gas purification assembly comprising a filter element comprising a gas-permeable, electrically conductive silicon carbide material and a current supply structure operable for self-heating said filter element,
the filter element includes an inlet for a gas stream to enter from the cooking cavity and an outlet for exhaust gas to exit,
the filter element further includes a first filter, a second filter, and a third filter, wherein the first filter, the second filter, and the third filter are installed in series to the flow of exhaust gases, wherein
the first filter has a first region defined between a first side of the first filter and a second side of the first filter, the first region of the first filter having a first porosity to permit the flow of exhaust gases through the first filter, wherein
the second filter has a second region defined between a first side of the second filter and a second side of the second filter, the second region of the second filter having a second porosity to permit the flow of exhaust gases through the second filter, and wherein
the third filter has a third region defined between a first side of the third filter and a second side of the third filter, the third region of the third filter having a third porosity to permit the flow of exhaust gases through the third filter,
wherein the first filter is closest to the inlet and is used to redistribute the gas stream,
wherein the third filter is closest to the outlet and has a reduced transverse cross section with respect to the first filter and the second filter, and
wherein only the second filter, arranged between the first filter and the third filter, includes a catalyst coating, and wherein
the first, second, and third filters are arranged such that the flow of exhaust gases can flow in series from the inlet to the first side of the first filter, through the first region of the first filter, to the second side of the first filter, to the first side of the second filter, through the second region of the second filter, to the second side of the second filter, to the first side of the third filter, through the third region of the third filter, to the second side of the third filter, and to the outlet.

2. The cooking oven according to claim 1, wherein the silicon carbide material is an open-cell foam silicon carbide material comprising a plurality of pores.

3. The cooking oven according to claim 2, wherein the silicon carbide material has an open-cell porosity of 30 to 90%.

4. The cooking oven according to claim 2, wherein the pores of the foam have a mean pore size of 0.05 mm to 5 mm.

5. The cooking oven according to claim 1, wherein at least one of the first porosity, second porosity, and third porosity is different.

6. The cooking oven according to claim 1, wherein the catalyst coating comprises platinum, palladium, rhodium, vanadium, titanium, zirconium, copper, nickel or in any combination or alloy thereof.

7. The cooking oven according to claim 1, wherein the current supply structure comprises a single pair of electrodes.

8. The cooking oven according to claim 1, wherein the current supply structure comprises a plurality of electrode pairs.

9. The cooking oven according to claim 1, wherein the filter element comprises at least one contact zone.

10. The cooking oven according to claim 9, wherein the contact zone consists of an infiltrated metal area.

11. The cooking oven according to claim 9, wherein the contact zone consists of a plated metal area.

12. The cooking oven according to claim 7, wherein the pair of electrodes consists of a central electrode and a peripheral electrode.

13. The cooking oven according to claim 7, wherein at least one electrode of the pair of electrodes is a mesh electrode.

14. The cooking oven according to claim 7, wherein at least one electrode of the pair of electrodes is a comb electrode.

15. The cooking oven according to claim 1, wherein the filter element has a conical shape or includes conical shape impressions.

16. A cooking oven comprising a cooking cavity and an exhaust gas purification assembly comprising a filter element comprising a gas-permeable, electrically conductive silicon carbide material and a current supply structure operable for self-heating said filter element, the filter element includes an inlet for a gas stream to enter from the cooking cavity and an outlet for exhaust gas to exit, wherein the silicon carbide material is an open-cell foam silicon carbide material comprising a plurality of pores, the pores of the foam have a mean pore sized of about 0.05 mm to about 5 mm, the filter element is composed of zones of different porosity, wherein the current supply structure comprises a plurality of electrode pairs, the filter element further includes a first filter, a second filter, and a third filter, wherein the first filter, the second filter, and the third filter are installed in series to the flow of exhaust gases, wherein the first filter is closest to the inlet and is used to redistribute the gas stream, wherein the third filter is closest to the outlet and has a reduced transverse cross section with respect to the first filter and the second filter, and wherein only the second filter, arranged between the first filter and the third filter, includes a catalyst coating, wherein the first filter has a first region defined between a first side of the first filter and a second side of the first filter, the first region of the first filter having a first porosity to permit the flow of exhaust gases through the first filter, wherein the second filter has a second region defined between a first side of the second filter and a second side of the second filter, the second region of the second filter having a second porosity to permit the flow of exhaust gases through the second filter, wherein the third filter has a third region defined between a first side of the third filter and a second side of the third filter, the third region of the third filter having a third porosity to permit the flow of exhaust gases through the third filter, and wherein the first, second, and third filters are arranged such that the flow of exhaust gases can flow in series from the inlet to the first side of the first filter, through the first region of the first filter, to the second side of the first filter, to the first side of the second filter, through the second region of the second filter, to the second side of the second filter, to the first side of the third filter, through the third region of the third filter, to the second side of the third filter, and to the outlet.

\* \* \* \* \*